US012337574B2

(12) United States Patent
Fischer et al.

(10) Patent No.: US 12,337,574 B2
(45) Date of Patent: Jun. 24, 2025

(54) PROJECTION ARRANGEMENT FOR A HEAD-UP DISPLAY (HUD) WITH P-POLARISED RADIATION

(71) Applicant: SAINT-GOBAIN GLASS FRANCE, Courbevoie (FR)

(72) Inventors: Klaus Fischer, Alsdorf (DE); Dagmar Schaefer, Herzogenrath (DE); Roberto Zimmermann, Solingen (DE); Jan Hagen, Bonn (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 1154 days.

(21) Appl. No.: 17/267,704

(22) PCT Filed: Oct. 25, 2019

(86) PCT No.: PCT/EP2019/079141
§ 371 (c)(1),
(2) Date: Feb. 10, 2021

(87) PCT Pub. No.: WO2020/194423
PCT Pub. Date: May 14, 2020

(65) Prior Publication Data
US 2021/0316533 A1    Oct. 14, 2021

(30) Foreign Application Priority Data

Nov. 9, 2018  (EP) ..................... 18205414

(51) Int. Cl.
*B32B 17/10* (2006.01)
*C03C 17/36* (2006.01)
(Continued)

(52) U.S. Cl.
CPC .. *B32B 17/10229* (2013.01); *B32B 17/10036* (2013.01); *B32B 17/10761* (2013.01);
(Continued)

(58) Field of Classification Search
CPC ........ B32B 17/10036; B32B 17/10229; B32B 17/10761; B32B 17/1077;
(Continued)

(56) References Cited

U.S. PATENT DOCUMENTS 2,750,833 A    6/1956  Gross
7,215,473 B2*  5/2007  Fleming ............ B32B 17/10009
                                                        359/585
(Continued)

FOREIGN PATENT DOCUMENTS

CN    104267499 A    1/2015
CN    204143067 U    2/2015
(Continued)

OTHER PUBLICATIONS

Google Patents translation of WO 2018110066 A1.*
(Continued)

*Primary Examiner* — Stephone B Allen
*Assistant Examiner* — Daniel J. Jordan
(74) *Attorney, Agent, or Firm* — Pillsbury Winthrop Shaw Pittman LLP

(57) ABSTRACT

A projection arrangement for a head-up display (HUD), includes a composite pane, including an outer and an inner pane connected to one another via a thermoplastic intermediate layer, with an HUD region; an electrically conductive coating on the surface of the outer or inner pane facing the intermediate layer or within the intermediate layer; and a projector that is directed toward the HUD region. The radiation of the projector is p-polarised. The composite pane with the electrically conductive coating has reflectance of at least 10% relative to p-polarised radiation in the spectral range from 450 nm to 650 nm. The electrically conductive coating includes at least three electrically conductive layers, which are each arranged between two dielectric layers or
(Continued)

Figure 1:
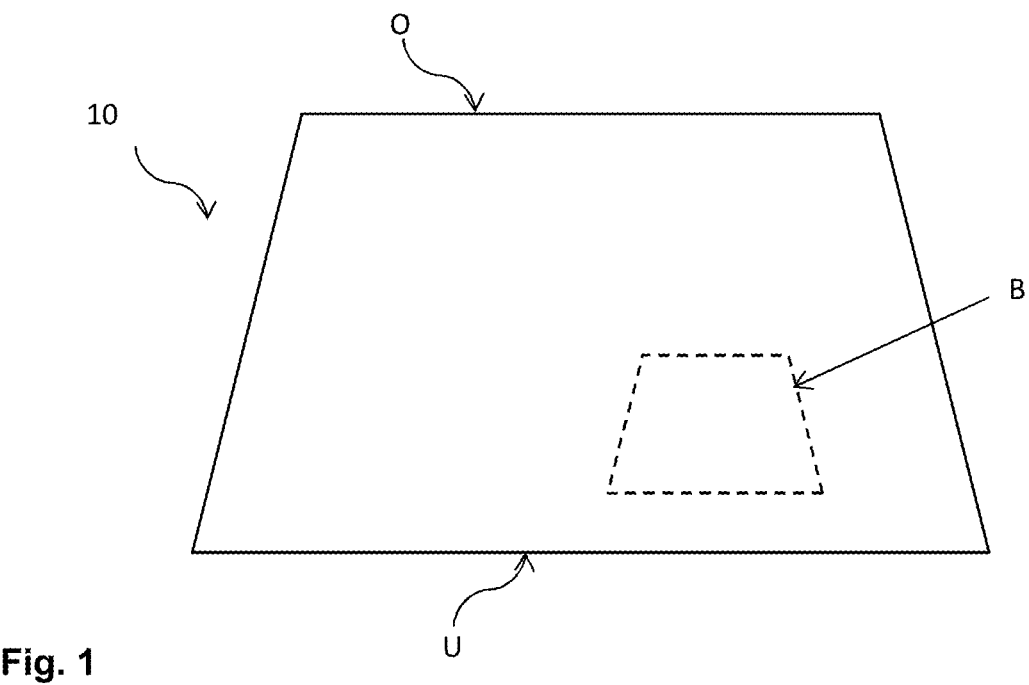

layer sequences. The sum of the thicknesses of all electrically conductive layers is at most 30 nm and the electrically conductive layers have a thickness of 5 nm to 10 nm.

20 Claims, 4 Drawing Sheets

(51) Int. Cl.
*G02B 5/30* (2006.01)
*G02B 27/01* (2006.01)

(52) U.S. Cl.
CPC ...... *C03C 17/3618* (2013.01); *C03C 17/3626* (2013.01); *C03C 17/3639* (2013.01); *C03C 17/3644* (2013.01); *C03C 17/3649* (2013.01); *C03C 17/3668* (2013.01); *G02B 5/3041* (2013.01); *G02B 5/3058* (2013.01); *G02B 27/0101* (2013.01); *B32B 2255/205* (2013.01); *B32B 2255/28* (2013.01); *B32B 2307/202* (2013.01); *B32B 2307/204* (2013.01); *B32B 2307/412* (2013.01); *B32B 2311/08* (2013.01); *B32B 2311/22* (2013.01); *B32B 2315/08* (2013.01); *B32B 2457/20* (2013.01); *B32B 2605/006* (2013.01); *B32B 2605/08* (2013.01); *C03C 2217/73* (2013.01); *G02B 2027/0194* (2013.01)

(58) Field of Classification Search
CPC ........ B32B 17/10788; B32B 2255/205; B32B 2255/28; B32B 2307/202; B32B 2307/204; B32B 2307/412; B32B 2311/08; B32B 2311/22; B32B 2315/08; B32B 2457/20; B32B 2605/006; B32B 2605/08; B60K 35/00; B60K 35/23; C03C 17/36; C03C 17/3618; C03C 17/3626; C03C 17/3639; C03C 17/3644; C03C 17/3649; C03C 17/3652; C03C 17/3655; C03C 17/3663; C03C 17/3668; C03C 17/3681; C03C 2217/73; G02B 2027/0121; G02B 2027/0194; G02B 27/0101; G02B 5/30; G02B 5/3041; G02B 5/3058; H05B 3/86
USPC ........... 359/13, 14, 275, 301, 304, 332, 454, 359/485.02, 487, 549, 580, 585, 630
See application file for complete search history.

(56) References Cited

U.S. PATENT DOCUMENTS

| | | | |
|---|---|---|---|
| 9,121,100 B2 * | 9/2015 | Hassan | ............... C23C 30/00 |
| 9,215,760 B2 * | 12/2015 | Fischer | ............ C03C 17/3673 |
| 10,437,054 B2 * | 10/2019 | Tso | ................ B32B 17/10229 |
| 2005/0012682 A1 | 1/2005 | Jenson et al. | |
| 2006/0023315 A1 | 2/2006 | Robinson | |
| 2007/0020465 A1 | 1/2007 | Thiel et al. | |
| 2007/0082219 A1 * | 4/2007 | Fleury | ............. B32B 17/10018 |
| | | | 428/656 |

FOREIGN PATENT DOCUMENTS

| | | | | |
|---|---|---|---|---|
| CN | 106094072 A | 11/2016 | | |
| CN | 205899060 U | 1/2017 | | |
| CN | 106526854 A | 3/2017 | | |
| CN | 207190747 U | 4/2018 | | |
| DE | 10 2014 220189 A1 | 4/2016 | | |
| DE | 20 2017 102552 U1 | 5/2017 | | |
| DE | 10 2017 102552 A1 | 8/2018 | | |
| EP | 1 880 243 A2 | 1/2008 | | |
| EP | 1 800 855 B1 | 2/2013 | | |
| EP | 3 187 917 A2 | 7/2017 | | |
| JP | 2001048602 A * | 2/2001 | ....... B32B 17/10761 |
| JP | 2007-512218 A | 5/2007 | | |
| JP | 2015-509866 A | 4/2015 | | |
| JP | 2017-538141 A | 12/2017 | | |
| KR | 10 2009 0021824 A | 3/2009 | | |
| RU | 2518863 C1 | 6/2014 | | |
| WO | WO 03/024155 A2 | 3/2003 | | |
| WO | WO 2006/122305 A2 | 11/2006 | | |
| WO | WO 2009/071135 A1 | 6/2009 | | |
| WO | WO 2013/104438 A1 | 7/2013 | | |
| WO | WO 2013/104439 A1 | 7/2013 | | |
| WO | WO 2013/190959 A1 | 12/2013 | | |
| WO | WO-2018110066 A1 * | 6/2018 | | |
| WO | WO 2019/046157 A1 | 3/2019 | | |

OTHER PUBLICATIONS

Google Patents translation of JP 200148602 A.*
International Search Report as issued in International Patent Application No. PCT/EP2019/079141, dated Jan. 7, 2020.
Neumann, A., "Simulation-based Measurement Technology for Testing Head-Up Displays," Jan. 2012, Retrieved from the Internet: URL:https://mediatum.ub.tum.de/doc/1079689/1079689.pdf, XP055558288, 170 pages.

* cited by examiner

PROJECTION ARRANGEMENT FOR A HEAD-UP DISPLAY (HUD) WITH P-POLARISED RADIATION

CROSS-REFERENCE TO RELATED APPLICATIONS

This application is the U.S. National Stage of PCT/EP2019/079141, filed Oct. 25, 2019, which in turn claims priority to European patent application number 18205414.8 filed Nov. 9, 2018. The content of these applications are incorporated herein by reference in their entireties.

The invention relates to a projection arrangement for a head-up display and its use.

Modern automobiles are increasingly equipped with so-called head-up displays (HUDs). With a projector, typically, in the region of the dashboard, images are projected onto the windshield, reflected there, and perceived by the driver as a virtual image behind the windshield (from his point of view). Thus, important data can be projected into the driver's field of vision, for example, the current driving speed, navigation or warning messages, which the driver can perceive without having to divert his glance from the road. Head-up displays can thus contribute significantly to an increase in traffic safety.

HUD projectors are predominantly operated with s-polarised radiation and irradiate the windshield with an angle of incidence of about 65%, which is near Brewster's angle for an air/glass transition (57.2° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP1800855B1, or EP1880243A2.

The wedge films are expensive such that production of such a composite pane for an HUD is quite cost intensive. Consequently, there is a need for HUD projection arrangements that work with windshields without wedge films. For example, it is possible to operate the HUD projector with p-polarised radiation, which is not significantly reflected by the pane surfaces. Instead, the windshield has an electrically conductive coating as a reflection surface for the p-polarised radiation. DE102014220189A1 discloses such an HUD projection arrangement that is operated with p-polarised radiation. Proposed, among other things, as a reflecting structure is a single metallic layer with a thickness of 5 nm to 9 nm, made, for example, of silver or aluminium.

Also known are more complex electrically conductive coatings for windshields, which can, for example, be used as IR-reflective coatings to reduce the heating of the vehicle interior and thus improve thermal comfort. The coatings can, however, also be used as heatable coatings by connecting them to a voltage source such that a current flows through the coating. Suitable coatings include conductive metallic layers, in particular, based on silver. Since these layers are susceptible to corrosion, it is customary to apply them on the surface of the outer pane or the inner pane facing the intermediate layer such that they have no contact with the atmosphere. Silver-containing transparent coatings are known, for example, from WO03/024155, US2007/0082219A1, US2007/0020465A1, WO2013/104438, or WO2013/104439.

When a conductive coating is to be used, on the one hand, as an IR-reflective or heatable coating and, on the other, as a reflection surface for an HUD, high requirements are imposed on its optical and electrical properties. In particular, at the same time, the sheet resistance must be sufficiently low, the light transmittance sufficiently high, the reflectivity for the HUD projector radiation sufficiently high, and the reflection colour relatively neutral.

The object of the invention is to provide an improved projection arrangement for a head-up display. The composite pane of the projection arrangement should work without a wedge film and have an electrically conductive coating that can, in particular, also be used as a heatable coating. The HUD projection should be generated with high intensity and the composite pane should have high light transmittance and a pleasing appearance.

The object of the present invention is accomplished according to the invention by a projection arrangement in accordance with claim 1. Preferred embodiments are disclosed in the dependent claims.

According to the invention, p-polarised radiation is used for generating the HUD image, and the composite pane has an electrically conductive coating that sufficiently reflects p-polarised radiation. Since the angle of incidence of about 65° typical for HUD projection arrangements is relatively close to Brewster's angle for an air/glass transition (57.2°, soda lime glass), the p-polarised radiation is hardly reflected by the pane surfaces, but instead primarily by the conductive coating. Consequently, ghost images do not occur or are hardly noticeable such that the use of an expensive wedge film can be dispensed with.

The coating according to the invention has relatively thin conductive layers, in particular silver layers, compared to customary coatings used until now. This also makes production of the panes more economical. The inventors have found, however, too low a thickness of the conductive layers results, in turn, in an increase in light absorption and reduces the transparency of the composite pane. This was surprising and not intuitive since with a reduction in the thickness of conductive layers, an increase in transmittance would actually be expected. The conductive layers according to the invention are sufficiently thick to avoid this effect. Despite the low layer thicknesses, the coating is nevertheless suitable for reflecting p-polarised radiation with sufficient intensity to generate an HUD image and for being used as a heatable coating, in particular with the use of voltage sources of 40-50 V, as are common in particular in electric vehicles. The optical requirements for windshield can also be met, in particular with regard to transparency and colouration. These are major advantages of the present invention.

The projection arrangement according to the invention for a head-up display (HUD) includes at least a composite pane with an electrically conductive coating and a projector. As is usual with HUDs, the projector irradiates a region of the windshield where the radiation is reflected in the direction of the viewer (driver), generating a virtual image, which the viewer perceives, from his point of view, as behind the windshield. The region of the windshield that can be irradiated by the projector is referred to as the HUD region. The beam direction of the projector can typically be varied by mirrors, in particular vertically, in order to adapt the projection to the body size of the viewer. The region in which the eyes of the viewer must be situated with a given mirror position is referred to as the "eye box window". This eye box window can be shifted vertically by adjustment of the mirrors, with the entire area thus available (i.e., the superimposing of all possible eye box windows) referred to as the "eye box". A viewer situated within the eye box can perceive the virtual image. This, of course, means that the eyes of the viewer must be situated within the eye box, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The composite pane comprises an outer pane and an inner pane that are joined to one another via a thermoplastic intermediate layer. The composite pane is intended, in a window opening, in particular the window opening of a vehicle, to separate the interior from the outside environment. In the context of the invention, the term "inner pane" refers to the pane of the composite pane facing the interior (vehicle interior). The term "outer pane" refers to the pane facing the outside environment. The composite pane is preferably a vehicle windshield (in particular the windshield of a motor vehicle, for example, of a passenger car or a truck).

The composite pane has an upper edge and a lower edge as well as two side edges extending therebetween. "Upper edge" refers to that edge that is intended to point upward in the installed position. "Lower edge" refers to that edge that is intended to point downward in the installed position. The upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the outside environment. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The composite pane has an electrically conductive coating, in particular a transparent electrically conductive coating. The electrically conductive coating is preferably applied to one of surfaces of the two panes facing the intermediate layer, i.e., the interior-side surface of the outer pane or the exterior-side surface of the inner pane. Alternatively, the electrically conductive coating can also be arranged within the thermoplastic intermediate layer, for example, applied to a carrier film that is arranged between two thermoplastic bonding films. The conductive coating can, for example, be provided as an IR-reflecting solar protection coating or also as a heatable coating that is electrically contacted and heats up when current flows through it. The term "transparent coating" means a coating that has average transmittance in the visible spectral range of at least 70%, preferably at least 80%, which thus does not substantially restrict vision through the pane. Preferably, at least 80% of the pane surface is provided with the coating according to the invention. In particular, the coating is applied to the pane surface over its entire surface with the exception of a peripheral edge region and, optionally, local regions that are intended to ensure the transmittance of electromagnetic radiation through the composite pane as communication windows, sensor windows, or camera windows, and, consequently, are not provided with the coating. The peripheral uncoated edge region has, for example, a width of up to 20 cm. It prevents direct contact of the coating with the surrounding atmosphere such that the coating is protected, inside the composite pane, against corrosion and damage.

The electrically conductive coating is a layer stack or a layer sequence, comprising a plurality of electrically conductive, in particular metal-containing layers, wherein each electrically conductive layer is in each case arranged between two dielectric layers or layer sequence. The coating is thus a thin-film stack having n electrically conductive layers and (n+1) dielectric layers or layer sequences, where n is a natural number and wherein, on a lower dielectric layer or layer sequence, a conductive layer and a dielectric layer or layer sequence follows alternatingly in each case. Such coatings are known as solar protection coatings and heatable coatings, wherein the electrically conductive layers are typically based on silver.

The electrically conductive coating according to the invention is adjusted, in particular through the selection of the materials and thicknesses of the individual layers and the structure of the dielectric layer sequences, such that the composite pane with the coating has reflectance relative to p-polarised radiation of at least 10% in the entire spectral range from 450 nm to 650 nm. This means that at no point in the spectral range from 450 nm to 650 nm does reflectance occur that is less than 10%. Thus, a sufficiently high intensity projection image is generated. Preferably, the reflectance relative to p-polarised radiation in the entire spectral range from 450 nm to 700 nm is at least 10%, particularly preferably in the entire spectral range from 450 nm to 800 nm.

Reflectance describes the proportion of the total incident radiation that is reflected. It is indicated in % (based on 100% incident radiation) or as a unitless number from 0 to 1 (normalised to the incident radiation). Plotted as a function of the wavelength, it forms the reflection spectrum.

In an advantageous embodiment, the composite pane with the electrically conductive coating has reflectance relative to p-polarised radiation of at least 12%, preferably of at least 13%, in the entire spectral range from 450 nm to 650 nm. The reflectance relative to p-polarised radiation is, for example, from 10% to 20%, preferably from 12% to 17%, in particular from 13% to 15% in the entire spectral range from 450 nm to 650 nm. Reflectances in this range can be easily realised with the coating according to the invention and are sufficiently high to produce a high-intensity HUD projection.

The mean of the reflectance relative to p-polarised radiation is preferably from 10% to 20%, preferably from 12% to 17%, in particular from 13% to 15% in the entire spectral range from 450 nm to 650 nm. In order to achieve the most colour neutral display of the projector image possible, the reflection spectrum should be as smooth as possible and should have no pronounced local minima and maxima. In the spectral range from 450 nm to 650 nm, the difference between the maximally occurring reflectance and the mean of the reflectance as well as the difference between the minimally occurring reflectance and the mean of the reflectance (based on 100% incident radiation) in a preferred embodiment should be at most 5%, particularly preferably at most 3%, most particularly preferably at most 1%.

In the context of the present invention, the statements concerning reflectance relative to p-polarised radiation are based on the reflectance measured with an angle of incidence of 65° relative to the interior-side surface normal. The data regarding the reflectance or the reflection spectrum are based on a reflection measurement with a light source that emits uniformly with a normalised radiation intensity of 100% in the spectral range under consideration.

The projector is arranged on the interior-side of the composite pane and irradiates the composite pane via the interior-side surface of the inner pane. It is directed toward the HUD region and irradiates it to generate the HUD projection. According to the invention, the radiation of the projector is p-polarised, preferably essentially purely p-polarised—the p-polarised radiation component is thus 100% or deviates only insignificantly therefrom. Thus, a particularly high intensity HUD image is produced and ghost images can be avoided. The indication of the polarisation direction is based on the plane of incidence of the radiation on the composite pane. The expression "p-polarised radiation" refers to radiation whose electric field oscillates in the plane of incidence. "S-polarised radiation" refers to radiation whose electric field oscillates perpendicular to the plane of incidence. The plane of incidence is generated by the vector of incidence and the surface normal of the composite pane in the geometric centre of the HUD region.

The radiation of the projector preferably strikes the composite pane with an angle of incidence from 45° to 70°, in particular from 60° to 70°. In an advantageous embodiment, the angle of incidence deviates from Brewster's angle by at most 10°. The p-polarised radiation is then reflected only insignificantly on the surface of the composite pane such that no ghost image is generated. The angle of incidence is the angle between the vector of incidence of the projector radiation and the interior-side surface normal (i.e., the surface normal on the interior-side external surface of the composite pane) in the geometric centre of the HUD region. Brewster's angle for an air-glass transition in the case of soda lime glass, which is commonly used for window panes, is 57.2°. Ideally, the angle of incidence should be as close as possible to this Brewster's angle. However, angles of incidence of 65°, which are common for HUD projection arrangements, are easily implemented in vehicles, and deviate only slightly from Brewster's angle can, for example, also be used such that the reflection of the p-polarised radiation increases only insignificantly.

Since the reflection of the projector radiation occurs substantially at the reflective coating and not at the external pane surfaces, it is not necessary to arrange the external pane surfaces at an angle relative to one another in order to avoid ghost images. The external surfaces of the composite pane are, consequently, preferably arranged substantially parallel to one another. The thermoplastic intermediate layer is preferably not implemented wedge-like, but, instead, has a substantially constant thickness, in particular even in the vertical course between the upper edge and the lower edge of the composite pane, just like the inner pane and the outer pane. A wedge-like intermediate layer would, in contrast, have a variable, in particular increasing thickness in the vertical course between the lower edge and the upper edge of the composite pane. The intermediate layer is typically formed from at least one thermoplastic film. Since standard films are significantly more economical than wedge films, the production of the composite pane is significantly more economical.

According to the invention, the electrically conductive coating comprises at least three electrically conductive layers, with the sum of the thicknesses of all electrically conductive layers being at most 30 nm. In a preferred embodiment, the sum of the thicknesses of all electrically conductive layers is from 15 nm to 30 nm, preferably from 20 nm to 25 nm. In the context of the present invention, thickness or layer thickness refers to the geometric thickness, not the optical thickness, which is the product of the refractive index and the geometric thickness. This is particularly advantageous in terms of the cost savings, and the requirements for reflection behaviour and other optical properties can be met. In a particularly advantageous embodiment, the number of electrically conductive layers is exactly three. More complex layer structures are in principle not necessary for achieving the required specifications of the coatings. With three electrically conductive layers and the corresponding number of dielectric layers or layer sequences, sufficient degrees of freedom are available to optimise the coating with respect to transmittance and reflection behaviour and colouration.

According to the invention, the electrically conductive layers, in particular all electrically conductive layers, have a thickness of 5 nm to 10 nm, particularly preferably of 7 nm to 8 nm. Layer thicknesses in the ranges indicated are particularly suitable for achieving the required specifications of the coating. In particular, the conductive layers are sufficiently thick to not result in increased absorption of visible light, which surprisingly occurs when conductive layers are too thin.

The functional, electrically conductive layers are responsible for the electrical conductivity of the coating. By dividing the entire conductive material into multiple layers separated from one another, the layers can be designed thinner in each case, as a result of which the transparency of the coating is increased. Each electrically conductive layer preferably contains at least one metal or one metal alloy, for example, silver, aluminium, copper, or gold, and is particularly preferably based on the metal or the metal alloy, in other words, consists substantially of the metal or the metal alloy apart from any dopants or impurities. Preferably used is silver or a silver-containing alloy. In an advantageous embodiment, the electrically conductive layer contains at least 90 wt.-% silver, preferably at least 99 wt.-% silver, particularly preferably at least 99.9 wt.-% silver.

According to the invention, dielectric layers or layer sequences are arranged between the electrically conductive layers and below the lowest conductive layer and above the uppermost conductive layer. Each dielectric layer or layer sequence has at least one anti-reflective layer. The anti-reflective layers reduce the reflection of visible light and thus increase the transparency of the coated pane. The anti-reflective layers contain, for example, silicon nitride (SiN), mixed silicon-metal nitrides such as silicon-zirconium nitride (SiZrN), aluminium nitride (AlN), or tin oxide (SnO). The mixed silicon-metal nitrides are particularly preferred. The anti-reflective layers can also have dopants. The layer thickness of the individual anti-reflective layers is preferably from 10 nm to 100 nm, in particular from 20 nm to 80 nm.

The anti-reflective layers can in turn be subdivided into at least two sublayers, in particular into a dielectric layer having a refractive index smaller than 2.1 and an optically high refractive layer having a refractive index greater than or equal to 2.1. The order of the two sublayers can, in principle, be selected arbitrarily, with the optically high refractive layer preferably arranged above the dielectric layer, which is particularly advantageous in terms of the sheet resistance. The thickness of the optically high refractive layer is preferably from 25% to 75% of the entire thickness of the anti-reflective layer. The optically high refractive layer having a refractive index greater than or equal to 2.1 contains, for example, MnO, $WO_3$, $Nb_2O_5$, $Bi_2O_3$, $TiO_2$, $Zr_3N_4$, and/or AlN, preferably a mixed silicon-metal nitride, for example, mixed silicon-aluminium nitride, mixed silicon-hafnium nitride, or mixed silicon-titanium nitride, particularly preferably mixed silicon-zirconium nitride (SiZrN). The dielectric layer having a refractive index lower than 2.1 preferably contains at least one oxide, for example, tin oxide, and/or one nitride, particularly preferably silicon nitride.

In an advantageous embodiment, one or a plurality of dielectric layer sequences has/have a first matching layer, preferably each dielectric layer sequence that is arranged below an electrically conductive layer. The first matching layer is preferably arranged above the anti-reflective layer. The first matching layer is preferably arranged directly below the electrically conductive layer such that it has direct contact with the conductive layer. This is particularly advantageous in terms of the crystallinity of the electrically conductive layer.

In an advantageous embodiment, one or more dielectric layer sequences has/have a smoothing layer, preferably each dielectric layer sequence that is arranged between two electrically conductive layers. The smoothing layer is arranged below one of the first matching layers, preferably between the anti-reflective layer and the first matching layer, if such a first matching layer is present. The smoothing layer preferably makes direct contact with the first matching layer The smoothing layer is responsible for optimisation, in particular smoothing of the surface for an electrically conductive layer subsequently applied above it. An electrically conductive layer deposited on a smoother surface has higher transmittance with, at the same time, lower sheet resistance. The layer thickness of a smoothing layer is preferably from 3 nm to 20 nm, particularly preferably from 4 nm to 12 nm, most particularly preferably from 5 nm to 10 nm, for example, about 7 nm. The smoothing layer preferably has a refractive index of less than 2.2.

The smoothing layer preferably contains at least one non-crystalline oxide. The oxide can be amorphous or partially amorphous (and thus partially crystalline) but is not completely crystalline. The non-crystalline smoothing layer has low roughness and thus forms an advantageously smooth surface for the layers to be applied above the smoothing layer. The non-crystalline smoothing layer is further responsible for an improved surface structure of the layer deposited directly above the smoothing layer, which is preferably the first matching layer. The smoothing layer can contain, for example, at least one oxide of one or more of the elements tin, silicon, titanium, zirconium, hafnium, zinc, gallium, and indium. The smoothing layer particularly preferably contains a non-crystalline mixed oxide. The smoothing layer most particularly preferably contains a mixed tin-zinc oxide (ZnSnO). The mixed oxide can have dopants. The smoothing layer can contain, for example, an antimony-doped mixed tin-zinc oxide. The mixed oxide preferably has substoichiometric oxygen content. The tin content is preferably between 10 and 40 wt.-%, particularly preferably between 12 and 35 wt.-%.

In an advantageous embodiment, one or more dielectric layer sequences, preferably each dielectric layer sequence, has/have a second matching layer that is arranged above an electrically conductive layer. The second matching layer is preferably arranged below the anti-reflective layer.

The first and the second matching layers are responsible for an improvement of the sheet resistance of the coating. The first matching layer and/or the second matching layer preferably contains zinc oxide $ZnO_{1-\delta}$ with $0<\delta<0.01$. The first matching layer and/or the second matching layer further preferably contains dopants. The first matching layer and/or the second matching layer can, for example, contain aluminium-doped zinc oxide (ZnO:Al). The zinc oxide is preferably deposited substoichiometrically with respect to oxygen in order to avoid a reaction of excess oxygen with the silver-containing layer. The layer thicknesses of the first matching layer and the second matching layer are preferably from 3 nm to 20 nm, particularly preferably from 50 nm to 15 nm, most particularly preferably from 8 nm to 12 nm, in particular about 10 nm.

In an advantageous embodiment, the electrically conductive coating includes one or more blocking layers. Preferably, at least one blocking layer is associated with at least one, particularly preferably with each electrically conductive layer. The blocking layer makes direct contact with the electrically conductive layer and is arranged immediately above or immediately below the electrically conductive layer. In other words, no other layer is arranged between the electrically conductive layer and the blocking layer. A blocking layer can also be arranged immediately above and immediately below a conductive layer in each case. The blocking layer preferably contains niobium, titanium, nickel, chromium, and/or alloys thereof, particularly preferably nickel-chromium alloys. The layer thickness of the blocking layer is preferably from 0.1 nm to 2 nm, particularly preferably from 0.1 nm to 1 nm. A blocking layer immediately below the electrically conductive layer serves in particular to stabilise the electrically conductive layer during a temperature treatment and improves the optical quality of the electrically conductive coating. A blocking layer immediately above the electrically conductive layer prevents contact of the sensitive electrically conductive layer with the oxidising reactive atmosphere during the deposition of the following layer by reactive cathodic sputtering, for example, of the second matching layer.

In the context of the invention, if a first layer is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer. In the context of the invention, if a first layer is arranged "above or below" a second layer, this does not necessarily mean that the first and the second layer are in direct contact with one another. One or more additional layers can be arranged between the first and the second layer provided this is not explicitly ruled out. The values indicated for refractive indexes are measured at a wavelength of 550 nm.

In an advantageous embodiment, a dielectric layer sequence is in each case arranged between two electrically conductive layers (21), which dielectric layer sequence comprises:

an anti-reflective layer (22) based on silicon nitride (SiN), mixed silicon-metal nitrides such as silicon-zirconium nitride (SiZrN), aluminium nitride (AlN), or tin oxide (SnO), preferably based on a mixed silicon-metal nitride, a smoothing layer (23) based on an oxide of one or more of the elements tin, silicon, titanium, zirconium, hafnium, zinc, gallium, and indium, a first and a second matching layer (24, 25) based on zinc oxide, and optionally, a blocking layer (26) based on niobium, titanium, nickel, chromium, and/or alloys thereof. A specific order of the layers is not required. An anti-reflective layer and a matching layer based on the above-mentioned preferred materials are preferably arranged below the lowest conductive layer and above the uppermost conductive layer. The preferred ranges already mentioned for the layer thicknesses of the individual layers apply.

The electrically conductive coating with the reflection characteristics according to the invention is, in principle, realisable in various ways, preferably using the above-described layers such that the invention is not restricted to a specific layer sequence. In the following, a particularly preferred embodiment of the coating is presented, with which particularly good results are achieved, in particular with a typical angle of incidence of the radiation of about 65°. The electrically conductive coating comprises at least three, in particular exactly three electrically conductive layers, preferably based on silver, with each electrically conductive layer having a thickness from 5 nm to 10 nm, in particular from 7 nm to 8 nm. In the following, the electrically conductive layers are numbered starting from the substrate on which the coating is deposited. The dielectric layer sequences below the lowest conductive layer, above the uppermost conductive layer, and between the conductive layers comprise in each case an anti-reflective layer, preferably based on a mixed silicon-metal nitride such as silicon-zirconium nitride, or silicon-hafnium nitride. The anti-reflective layer below the first conductive layer has a thickness of 15 nm to 25 nm, particularly preferably of 20 nm to 24 nm. The anti-reflective layer between the first and the second conductive layer has a thickness of 25 nm to nm, preferably of 30 nm to 35 nm. The anti-reflective layer between the second and the third conductive layer has a thickness of 70 nm to 90 nm, preferably of 75 nm to 80 nm. The anti-reflective layer above the third conductive layer has a thickness of 35 nm to 45 nm, preferably of 37 nm to 42 nm.

A most particularly preferred embodiment of the electrically conductive coating contains or consists of the following layer sequence, starting from the substrate:
- an anti-reflective layer with a thickness of 15 nm to 25 nm, preferably of 20 nm to 24 nm, preferably based on a mixed silicon-metal nitride such as silicon-zirconium nitride or silicon-hafnium nitride,
- a first matching layer with a thickness of 5 nm to 15 nm, preferably of 8 nm to 12 nm, preferably based on zinc oxide,
- an electrically conductive layer based on silver with a thickness of 6 nm to 9 nm,
- optionally, a blocking layer with a thickness of 0.1 nm to 0.5 nm, preferably based on NiCr,
- a second matching layer with a thickness of 5 nm to 15 nm, preferably of 8 nm to 12 nm, preferably based on zinc oxide,
- an anti-reflective layer with a thickness of 25 nm to 40 nm, preferably of 30 nm to 35 nm, preferably based on a mixed silicon-metal nitride such as silicon-zirconium nitride or silicon-hafnium nitride,
- a smoothing layer with a thickness of 5 nm to 10 nm, preferably based on mixed tin-zinc oxide,
- a first matching layer with a thickness of 5 nm to 15 nm, preferably of 8 nm to 12 nm, preferably based on zinc oxide,
- an electrically conductive layer based on silver with a thickness of 6 nm to 10 nm,
- optionally, a blocking layer with a thickness of 0.1 nm to 0.5 nm, preferably based on NiCr,
- a second matching layer with a thickness of 5 nm to 15 nm, preferably of 8 nm to 12 nm, preferably based on zinc oxide,
- an anti-reflective layer with a thickness of 70 nm to 90 nm, preferably of 75 nm to 80 nm, preferably based on a mixed silicon-metal nitride such as silicon-zirconium nitride or silicon-hafnium nitride,
- a smoothing layer with a thickness of 5 nm to 10 nm, preferably based on mixed tin-zinc oxide,
- a first matching layer with a thickness of 5 nm to 15 nm, preferably of 8 nm to 12 nm, preferably based on zinc oxide,
- an electrically conductive layer based on silver with a thickness of 6 nm to 9 nm,
- optionally, a blocking layer with a thickness of 0.1 nm to 0.5 nm, preferably based on NiCr,
- a second matching layer with a thickness of 5 nm to 15 nm, preferably of 8 nm to 12 nm, preferably based on zinc oxide,
- an anti-reflective layer with a thickness of 35 nm to 45 nm, preferably of 37 nm to 42 nm, preferably based on a mixed silicon-metal nitride such as silicon-zirconium nitride or silicon-hafnium nitride.

An especially particularly preferred embodiment of the electrically conductive coating contains or consists of the following layer sequence, starting from the substrate:
- an anti-reflective layer based on a mixed silicon-metal nitride such as silicon-zirconium nitride or silicon-hafnium nitride with a thickness of 21 nm to 23 nm,
- a first matching layer based on zinc oxide with a thickness of 6 nm to 11 nm,
- an electrically conductive layer based on silver with a thickness of 6.5 nm to 8.5 nm,
- optionally, a blocking layer based on NiCr with a thickness of 0.1 nm to 0.3 nm,
- a second matching layer based on zinc oxide with a thickness of 9 nm to 11 nm,
- an anti-reflective layer based on a mixed silicon-metal nitride such as silicon-zirconium nitride or silicon-hafnium nitride with a thickness of 32 nm to 34 nm,
- a smoothing layer based on mixed tin-zinc oxide with a thickness of 6 nm to 8 nm,
- a first matching layer based on zinc oxide with a thickness of 9 nm to 11 nm,
- an electrically conductive layer based on silver with a thickness of 7 nm to 9 nm,
- optionally, a blocking layer based on NiCr with a thickness of 0.1 nm to 0.3 nm,
- a second matching layer based on zinc oxide with a thickness of 9 nm to 11 nm,
- an anti-reflective layer based on a mixed silicon-metal nitride such as silicon-zirconium nitride or silicon-hafnium nitride with a thickness of 76.5 nm to 78.5 nm,
- a smoothing layer based on mixed tin-zinc oxide with a thickness of 6 nm to 8 nm,
- a first matching layer based on zinc oxide with a thickness of 9 nm to 11 nm,
- an electrically conductive layer based on silver with a thickness of 6.5 nm to 8.5 nm,
- optionally, a blocking layer based on NiCr with a thickness of 0.1 nm to 0.3 nm,
- a second matching layer based on zinc oxide with a thickness of 9 nm to 11 nm,
- an anti-reflective layer based on a mixed silicon-metal nitride such as silicon-zirconium nitride or silicon-hafnium nitride with a thickness of 38 nm to 40 nm.

When a layer is based on a material, the layer consists for the most part of this material in addition to any impurities or dopants.

The sheet resistance of the electrically conductive coating is preferably from $1\Omega/\square$ to $2\Omega/\square$. Such a sheet resistance can be easily achieved with the coating according to the invention while ensuring the desired optical properties.

In one embodiment of the invention, the electrically conductive coating is connected to a voltage source in order to conduct an electric current through the coating, which is heated thereby. The composite pane can be heated in this manner. Voltages considered include, in particular, on-board voltages customary in the vehicle sector, for example, 12 V to 14 V. It has been demonstrated that with the coating according to the invention, good heating outputs are achieved when it is connected to a voltage source of 40 V to 50 V, as are, in particular, usual in electric vehicles, for example, 42 V or 48 V. Thus, heating outputs of $1500 \text{ W/m}^2$ to $5000 \text{ W/m}^2$ can be achieved, in particular $2200 \text{ W/m}^2$ to $3000 \text{ W/m}^2$, which is suitable for quickly freeing the composite pane of condensed moisture or icing. For the connection to the voltage source, the coating is preferably provided with bus bars, which can be connected to the poles of the voltage source in order to introduce current into the coating over as large a part of the pane width as possible. The bus bars can, for example, be formed as printed and baked conductors, typically in the form of a baked screen printing paste with gas frits and silver particles. However, alternatively, strips of an electrically conductive foil that are placed or glued onto the coating can be used as bus bars, for example, copper foil or aluminium foil. Typically, the two busbars are positioned near two opposite side edges of the composite pane, for example, the upper and lower edge.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and the thermoplastic intermediate layer can be clear and colourless, but also tinted or coloured. In a preferred embodiment, the total transmittance through the windshield is greater than 70%. The term "total transmittance" is based on the process for testing the light permeability of motor vehicle windows specified by ECE-R 43, Annex 3, § 9.1. The outer pane and the inner panes can, independently of one another, be non-prestressed, partially prestressed, or prestressed. If at least one of the panes is to be prestressed, this can be thermal or chemical prestressing. It must be ensured that the electrically conductive coating does not reduce the total transmittance too much.

In addition to the total transmittance, the composite pane should also have an exterior-side reflection colour that is as neutral as possible in order to be aesthetically pleasing to the user. The reflection colour is typically characterised in the La*b* colour space, at an angle of incidence from 8° and 60° relative to the exterior-side surface normal using a D65 light source and an observation angle of 10°. It has been demonstrated that with the coating according to the invention, composite panes without too much colour cast can be realised. At an angle of incidence of 8°, the a* value is preferably from −4 to 0 and the b* value is from −13 to −3. At an angle of incidence of 60°, the a* value is preferably from −2 to 2 and the b* value is from −9 to 1. Such panes have a sufficiently inconspicuous colour cast to be accepted by the automotive industry.

The composite pane is preferably curved in one or a plurality of spatial directions, as is customary for motor vehicle window panes, wherein typical radii of curvature are in the range from approx. 10 cm to approx. 40 m. The composite pane can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm.

The composite pane can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The electrically conductive coating is preferably applied by physical vapour deposition (PVD) onto the inner pane, particularly preferably by cathodic sputtering ("sputtering"), most particularly preferably by magnetron-enhanced cathodic sputtering. The coating is preferably applied on the panes before lamination. Instead of applying the electrically conductive coating on a pane surface, it can, in principle also be provided on a carrier film that is arranged in the intermediate layer.

If the composite pane is to be curved, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the conductive coating.

The invention also includes the use of a composite pane implemented according to the invention as a projection surface of a projection arrangement for a head-up display, wherein a projector, whose radiation is p-polarised, is directed toward the HUD region. The above-described preferred embodiments apply mutatis mutandis to the use.

The invention further includes the use of a projection arrangement according to the invention as an HUD in a motor vehicle, in particular in a passenger car or a truck.

In the following, the invention is explained in detail with reference to drawings and exemplary embodiments. The drawings are schematic representations and are not true to scale. The drawings in no way restrict the invention.

Figure 2:
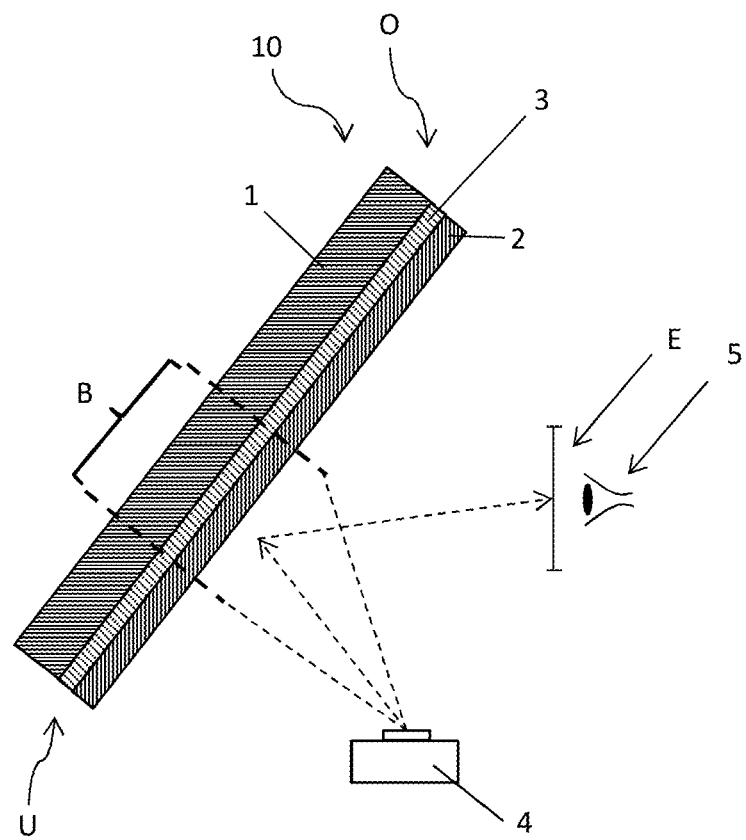
Figure 3:
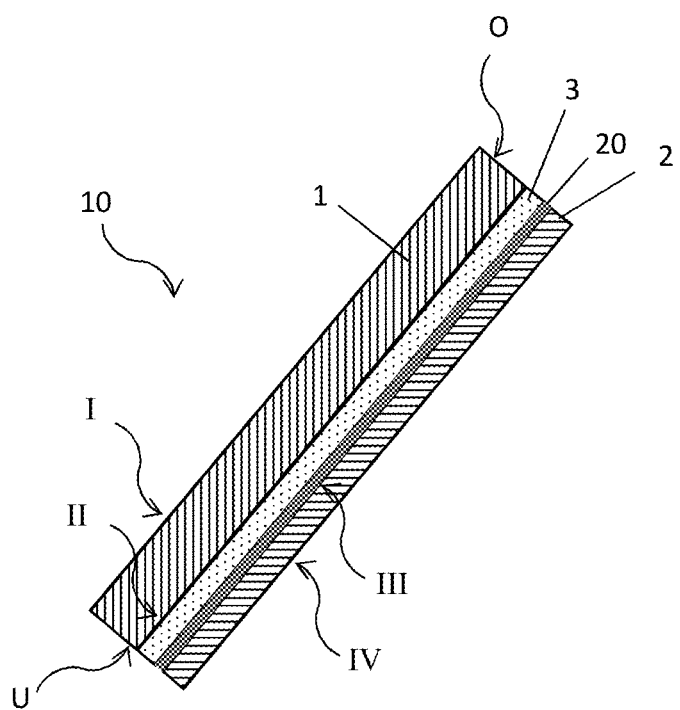
Figure 4:
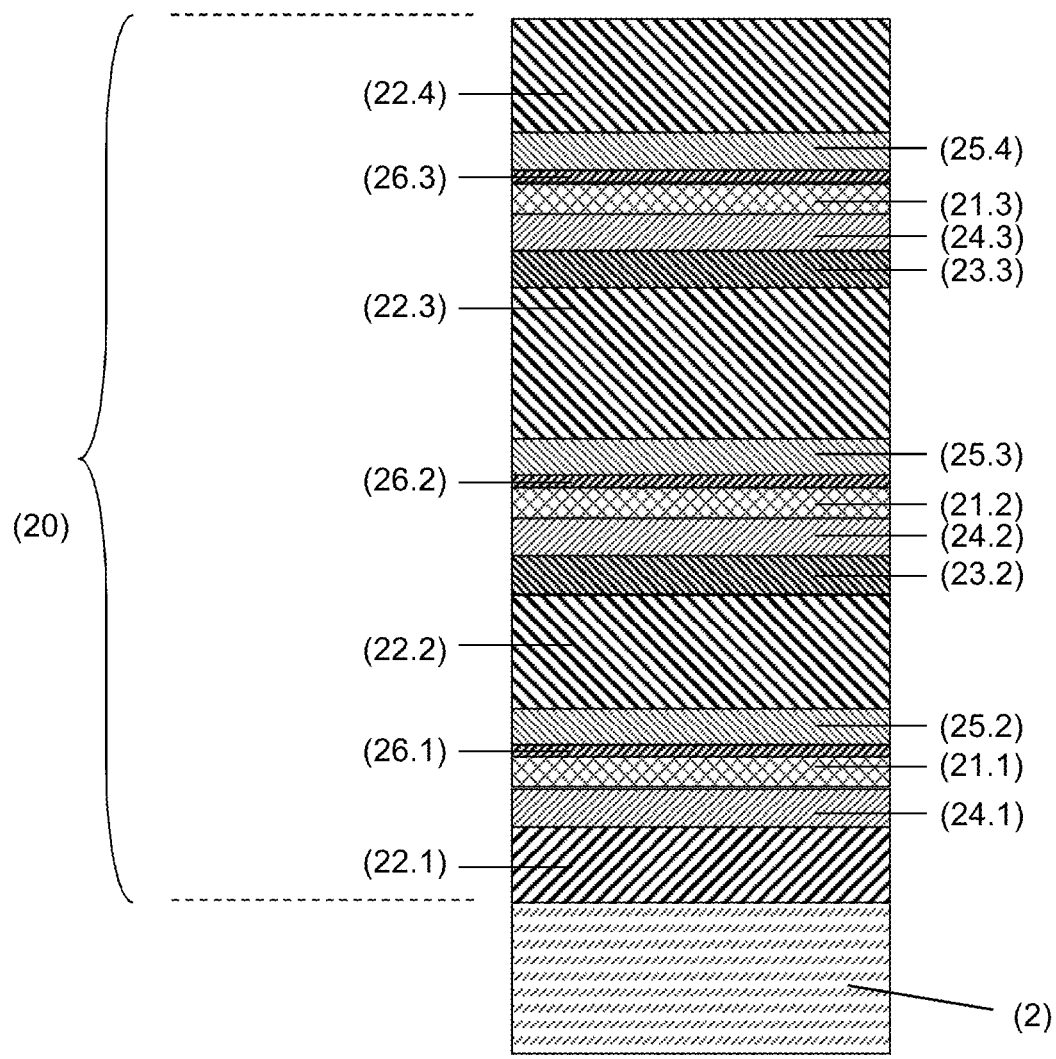
Figure 5:
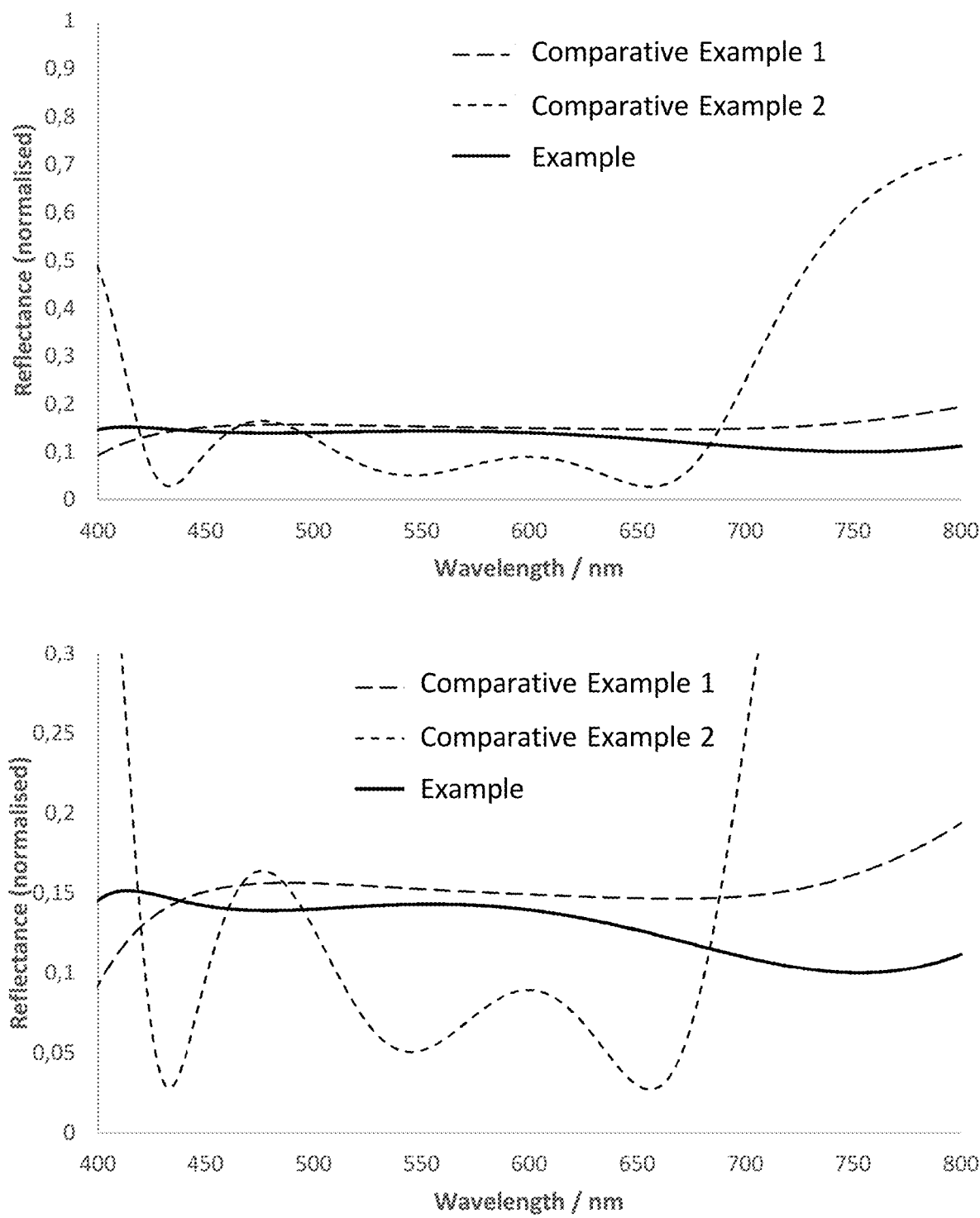

They depict:

FIG. 1 a plan view of a composite pane of a generic projection arrangement,

FIG. 2 a cross-section through a generic projection arrangement,

FIG. 3 a cross-section through a composite pane of a projection arrangement according to the invention, FIG. 4 a cross-section through an electrically conductive coating according to the invention, and FIG. 5 reflection spectrum relative to p-polarised radiation of a composite pane with an electrically conductive coating according to the invention and two Comparative Examples.

FIG. 1 and FIG. 2 each depict a detail of a generic projection arrangement for an HUD. The projection arrangement comprises a composite pane 10, in particular the windshield of a passenger car. The projection arrangement also comprises a projector 4 that is directed at a region B of the composite pane 10. In the region B, usually referred to as an HUD region, the projector 4 can generate images that are perceived by a viewer 5 (vehicle driver) as virtual images on the side of the composite pane 10 facing away from him if his eyes are situated within the so-called eye box E.

The composite pane 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the outside environment; the inner pane 2, the vehicle interior.

FIG. 3 depicts an embodiment of a composite pane 10 implemented according to the invention. The outer pane 1 has an exterior-side surface I that faces the outside environment in the installed position and an interior-side surface II that faces the interior in the installed position. Likewise, the inner pane 2 has an exterior-side surface III that faces the outside environment in the installed position and an interior-side surface IV that faces the interior in the installed position. The outer pane 1 and the inner pane 2 are made, for example, of soda lime glass.

The outer pane 1 has, for example, a thickness of 2.1 mm; the inner pane 2, a thickness of 1.6 mm. The intermediate layer 3 is made, for example, of a PVB film with a thickness of 0.76 mm. The PVB film has an essentially constant thickness, apart from any surface roughness common in the art.

The exterior-side surface III of the inner pane 2 is provided with an electrically conductive coating 20 according to the invention, which is provided as a reflection surface for the projector radiation and, additionally, for example, as an IR-reflective coating or as a heatable coating.

According to the invention, the radiation of the projector 4 is p-polarised, in particular essentially purely p-polarised. Since the projector 4 irradiates the composite pane 10 at an angle of incidence of about 65°, which is close to Brewster's angle, the radiation of the projector is only insignificantly reflected at the external surfaces I, IV of the composite pane 10. In contrast, the electrically conductive coating 20 according to the invention is optimised for reflection of p-polarised radiation. It serves as a reflection surface for the radiation of the projector 4 to generate the HUD projection.

FIG. 4 depicts the layer sequence of an electrically conductive coating 20 according to the invention. The coating 20 contains three electrically conductive layers 21 (21.1, 21.2, 21.3). Each electrically conductive layer 21 is in each case arranged between two of a total of four anti-reflective layers 22 (22.1, 22.2, 22.3, 22.4). The coating 20 also contains two smoothing layers 23 (23.2, 23.3), three first matching layers 24 (24.1, 24.2, 24.3), three second matching layers 25 (25.2, 25.3, 25.4), and three blocking layers 26 (26.1, 26.2, 26.3).

The order of the layers can be seen schematically in the figure. The layer sequence of a composite pane 10 with the coating 20 on the exterior-side surface III of the inner pane 2 is also presented, together with the materials and layer thicknesses of the individual layers, in Table 1 (Example). Table 1 also depicts the layer sequence of two Comparative Examples with, in each case, four electrically conductive layers 21. Comparative Example 2 is an electrically conductive coating, as is currently already in use; and Comparative Example 1 is a coating with, in contrast, significantly lower layer thicknesses of the conductive layers 21. The materials of the layers can have dopants that are not indicated in the Table. For example, layers based on SnZnO can be doped with antimony; and layers based on ZnO, SiN, or SiZrN, with aluminium.

The comparison of the Example with the Comparative Example 2 makes it clear that the coating 20 according to the invention is characterised in particular by substantially thinner electrically conductive layers 21. As a result, the coating 20 according to the invention is more economical to deposit. The conductivity is nevertheless sufficiently high to use the coating 20 according to the invention as a heatable coating, in particular in connection with supply voltages of 40 V to 50 V. The desired reflection properties, the desired sheet resistance, and other optical properties are adjusted by suitable design of the dielectric layers.

The Comparative Example 1 has a similar total thickness of all electrically conductive layers 21 to that of the Example. However, this is distributed over more conductive layers such that the thickness of the individual layers is lower than in the Example. As has been surprisingly shown, layer thicknesses that are too low result in an increase in light absorption. This can be avoided with the layer structure according to the invention.

In the Example according to the invention, the anti-reflective layers 22 are individual layers based on silicon-zirconium nitride. In the Comparative Examples, the anti-reflective layers are sometimes divided into two individual layers: one layer based on silicon nitride and one layer based on silicon-zirconium nitride. Such a division of the anti-reflective layers can contribute to a reduction in sheet resistance and can, in principle, also be used within the scope of the invention. In the present Example, however, it is not necessary in order to achieve the required specifications of the composite pane.

TABLE 1

| | | Materials and Layer Thicknesses | | | | | |
|---|---|---|---|---|---|---|---|
| Reference Characters | | Example | | Comp. Example 1 | | Comp. Example 2 | |
| 1 | | Glass | 2.1 mm | Glass | 2.1 mm | Glass | 2.1 mm |
| 3 | | PVB | 0.76 mm | PVB | 0.76 mm | PVB | 0.76 mm |
| | 22.5 | — | | SiZrN | 36.8 nm | SiZrN | 52.2 nm |
| | 25.5 | — | | ZnO | 10.0 nm | ZnO | 10.0 nm |
| | 26.4 | — | | NiCr | 0.1 nm | NiCr | 0.2 nm |
| | 21.4 | — | | Ag | 6.6 nm | Ag | 14.1 nm |
| | 24.4 | — | | ZnO | 10.0 nm | ZnO | 10.0 nm |
| | 23.4 | — | | SnZnO | 7.0 nm | SnZnO | 7.0 nm |
| | 22.4 | SiZrN | 39.0 nm | SiZrN | 23.5 nm | SiZrN | 22.9 nm |
| | | | | SiN | 29.8 nm | SiN | 29.8 nm |
| | 25.4 | ZnO | 10.0 nm | ZnO | 10.0 nm | ZnO | 10.0 nm |
| | 26.3 | NiCr | 0.1 nm | NiCr | 0.1 nm | NiCr | 0.2 nm |
| | 21.3 | Ag | 7.5 nm | Ag | 2.0 nm | Ag | 14.2 nm |
| | 24.3 | ZnO | 10.0 nm | ZnO | 10.0 nm | ZnO | 10.0 nm |
| | 23.3 | SnZnO | 7.0 nm | SnZnO | 7.0 nm | SnZnO | 7.0 nm |
| 20 | 22.3 | SiZrN | 77.6 nm | SiZrN | 12.9 nm | SiZrN | 20.1 nm |
| | | | | | | SiN | 29.6 nm |
| | 25.3 | ZnO | 10.0 nm | ZnO | 10.0 nm | ZnO | 10.0 nm |
| | 26.2 | NiCr | 0.1 nm | NiCr | 0.1 nm | NiCr | 0.2 nm |
| | 21.2 | Ag | 8.0 nm | Ag | 8.5 nm | Ag | 17.1 nm |
| | 24.2 | ZnO | 10.0 nm | ZnO | 10.0 nm | ZnO | 10.0 nm |

TABLE 1-continued

| | | Materials and Layer Thicknesses | | | | |
|---|---|---|---|---|---|---|
| Reference Characters | | Example | | Comp. Example 1 | | Comp. Example 2 |
| 23.2 | SnZnO | 7.0 nm | SnZnO | 7.0 nm | SnZnO | 7.0 nm |
| 22.2 | SiZrN | 33.0 nm | SiZrN | 20.4 nm | SiZrN | 19.4 nm |
| | | | | | SiN | 34.1 nm |
| 25.2 | ZnO | 10.0 nm | ZnO | 10.0 nm | ZnO | 10.0 nm |
| 26.1 | NiCr | 0.1 nm | NiCr | 0.1 nm | NiCr | 0.2 nm |
| 21.1 | Ag | 7.5 nm | Ag | 6.0 nm | Ag | 11.7 nm |
| 24.1 | ZnO | 10.0 nm | ZnO | 10.0 nm | ZnO | 10.0 nm |
| 22.1 | SiZrN | 21.8 nm | SiN | 20.6 nm | SiN | 28.8 nm |
| 2 | Glass | 1.6 mm | Glass | 1.6 mm | Glass | 1.6 mm |

FIG. 5 depicts the reflection spectrum relative to p-polarised radiation of a composite pane 10 with a prior art conductive coating 20 per the Comparative Examples and a conductive coating according to the invention per the Example (cf. Table 1). The spectra were measured on the interior-side at an angle of incidence of 65°, thus simulating the reflection behaviour for the HUD projector. The two representations of the figure differ only in the scaling of the ordinate.

Compared to the Comparative Example 2, the Example according to the invention has, on the one hand, a higher average reflection in the relevant spectral range and is, on the other hand, considerably smoother than the Comparative Example. This results in a higher-intensity and more colour-neutral display of the HUD projection.

The Comparative Example 1 has similar reflectance in the relevant spectral range and similar smoothness to those of the Example. The Comparative Example 1 is, consequently, also suitable for generating an HUD projection with p-polarised light. However, the thin silver layers per of the Comparative Example 1 surprisingly reduce the light transmittance through the composite pane, which can be critical in the case of windshields.

The reflectance for the Example is at least 13% in the entire spectral range from 450 nm to 650 nm and at least 15% for the Comparative Example 1, whereas values of only 3% occur for the Comparative Example 2. For the Example, the difference between the maximally occurring reflectance and the mean of the reflectance is 0%, and the difference between the minimally occurring reflectance and the mean of the reflectance is 1% in the spectral range from 450 nm to 650 nm. For the Comparative Example 1, the corresponding values are 1% and 0%, respectively; and for the Comparative Example 2, 7% and 6%, respectively.

Table 2 indicates some optical values of the composite pane according to the invention (Example per Table 1) and a Comparative Example (Comparative Example 1 per table 1) that are familiar to the person skilled in the art and are customarily used to characterise vehicle windows. Here, RL stands for the integrated light reflection and TL for the integrated light transmittance (per ISO 9050). The notation after RL and TL indicates the light source used, with A representing the light source A and HUD representing an HUD projector with radiation wavelengths of 473 nm, 550 nm, and 630 nm (RGB). The angle notation after the light type indicates the angle of incidence of the radiation relative to the exterior-side surface normal. Angles of incidence less than 90° thus indicate exterior-side irradiation and angles of incidence greater than 90° indicate interior-side irradiation. The specified angle of incidence of 115° corresponds to an angle of incidence relative to the interior-side surface normal of 65° (=180°−115°) and simulates the irradiation with the projector according to the invention. In each case, below the reflection values are the associated colour values a* and b* in the L*a*b* colour space, followed by the indication of the light source used (light source D65 and HUD projector) and the indication of the observation angle (angle at which the light beam in the eye strikes the retina).

TTS ISO 13837 represents the total irradiated solar energy, measured per ISO 13837, and is a measure of thermal comfort.

The integral reflection values and colour values are similar for both panes. The interior-side reflection with regard to the p-polarised HUD projector radiation is sufficiently high to ensure a high-intensity HUD projection. At the same time, the exterior-side reflection colour is relatively neutral such that the composite pane has no unpleasant colour cast. The Example according to the invention has, however, due to the thicker silver layers, significantly higher light transmittance, which is advantageous for use as a windshield.

The sheet resistance of the coating 20 was 1.5Ω/□ such that with a supply voltage of, for example, 42 V and a typical windshield height (distance between the bus bars), a heating power of about 2300 W/m² can be achieved.

TABLE 2

| | Example | Comparative Example 1 |
|---|---|---|
| RL A 8° /% | 16.8 | 16.9 |
| a* (D65 / 10°) | −1.9 | −2.0 |
| b* (D65 / 10°) | −9.5 | −5.0 |
| RL A 60° /% | 21.8 | 22.3 |
| a* (D65 / 10°) | 0.7 | 1.1 |
| b* (D65 / 10°) | −5.1 | −2.6 |
| RL HUD p-pol. 115° /% | 14.2 | 15.2 |
| a* (HUD / 10°) | −0.8 | −1.0 |
| b* (HUD / 10°) | −0.2 | 0.2 |
| TL A 0° /% | 73.0 | 71.6 |
| TTS ISO 13837 /% | 56.0 | 53.4 |

LIST OF REFERENCE CHARACTERS

(10) composite pane
(1) outer pane
(2) inner pane
(3) thermoplastic intermediate layer
(4) projector
(5) viewer/vehicle driver
(20) electrically conductive coating
(21) electrically conductive layer
(21.1), (21.2), (21.3), (21.4) 1st, 2nd, 3rd, 4th electrically conductive layer
(22) anti-reflective layer
(22.1), (22.2), (22.3), (22.4), (22.5) 1st, 2nd, 3rd, 4th, 5th anti-reflective layer
(23) smoothing layer
(23.2), (23.3), (23.4) 1st, 2nd, 3rd smoothing layer
(24) first matching layer
(24.1), (24.2), (24.3), (24.4) 1st, 2nd, 3rd, 4th first matching layer
(25) second matching layer
(25.2), (25.3), (25.4), (25.5) 1st, 2nd, 3rd, 4th second matching layer
(26) blocking layer
(26.1), (26.2), (26.3), (26.4) 1st, 2nd, 3rd, 4th blocking layer
(O) upper edge of the composite pane 10
(U) lower edge of the composite pane 10

(B) HUD region of the der composite pane 10
(E) eye box
(I) exterior-side surface of the outer pane 1, facing away from the intermediate layer 3
(II) interior-side surface of the outer pane 1, facing the intermediate layer 3
(III) exterior-side surface of the inner pane 2, facing the intermediate layer 3
(IV) interior-side surface of the inner pane 2, facing away from the intermediate layer 3

The invention claimed is:

1. Projection arrangement for a head-up display (HUD), comprising:
    a composite pane, comprising an outer pane and an inner pane, which are connected to one another via a thermoplastic intermediate layer, with an HUD region;
    an electrically conductive coating on a surface of the outer pane or of the inner pane facing the intermediate layer or within the intermediate layer; and
    a projector that is directed toward the HUD region;
    wherein a radiation of the projector is p-polarised,
    wherein the composite pane with the electrically conductive coating has reflectance of at least 10% relative to p-polarised radiation in the entire spectral range from 450 nm to 650 nm, and
    wherein the electrically conductive coating includes three electrically conductive layers, which are each arranged between two dielectric layers or layer sequences,
    wherein a sum of thicknesses of all three electrically conductive layers is at most 30 nm, wherein the three electrically conductive layers each have a thickness of 5 nm to 10 nm, and wherein a difference between a maximally occurring reflectance and a mean of the reflectance as well as a difference between a minimally occurring reflectance and a mean of the reflectance relative to p-polarised radiation is at most 5% in the entire spectral range from 450 nm to 650 nm.

2. The projection arrangement according to claim 1, wherein the composite pane with the electrically conductive coating has reflectance of at least 12% relative to p-polarised radiation in the entire spectral range from 450 nm to 650 nm.

3. The projection arrangement according to claim 1, wherein the sum of the thicknesses of all three electrically conductive layers is from 15 nm to 25 nm.

4. The projection arrangement according to claim 1, wherein the electrically conductive layers each have a thickness of 7 nm to 8 nm.

5. The projection arrangement according to claim 1, wherein the electrically conductive layers comprise silver.

6. Projection arrangement for a head-up display (HUD), comprising:
    a composite pane, comprising an outer pane and an inner pane, which are connected to one another via a thermoplastic intermediate layer, with an HUD region;
    an electrically conductive coating on a surface of the outer pane or of the inner pane facing the intermediate layer or within the intermediate layer; and
    a projector that is directed toward the HUD region;
    wherein a radiation of the projector is p-polarised,
    wherein the composite pane with the electrically conductive coating has reflectance of at least 10% relative to p-polarised radiation in the entire spectral range from 450 nm to 650 nm, and
    wherein the electrically conductive coating includes three electrically conductive layers, which are each arranged between two dielectric layers or layer sequences,
    wherein a sum of thicknesses of all three electrically conductive layers is at most 30 nm,
    wherein the three electrically conductive layers each have a thickness of 5 nm to 10 nm, and
    wherein the electrically conductive coating comprises
        a first anti-reflective layer below a first conductive layer of the three electrically conductive layers that has a thickness of 15 nm to 25 nm,
        a second anti-reflective layer between the first conductive layer and a second conductive layer of the three electrically conductive layers that has a thickness of 25 nm to 40 nm,
        a third anti-reflective layer between the second conductive layer and a third conductive layer of the three electrically conductive layers that has a thickness of 70 nm to 90 nm, and
        a fourth anti-reflective layer above the third conductive layer that has a thickness of 35 nm to 45 nm.

7. The projection arrangement according to claim 6, wherein the first, second, third and fourth anti-reflective layers each comprise a mixed silicon-metal nitride.

8. Projection arrangement for a head-up display (HUD), comprising:
    a composite pane, comprising an outer pane and an inner pane, which are connected to one another via a thermoplastic intermediate layer, with an HUD region;
    an electrically conductive coating on a surface of the outer pane or of the inner pane facing the intermediate layer or within the intermediate layer; and
    a projector that is directed toward the HUD region;
    wherein a radiation of the projector is p-polarised,
    wherein the composite pane with the electrically conductive coating has reflectance of at least 10% relative to p-polarised radiation in the entire spectral range from 450 nm to 650 nm, and
    wherein the electrically conductive coating includes three electrically conductive layers, which are each arranged between two dielectric layers or layer sequences,
    wherein a sum of thicknesses of all three electrically conductive layers is at most 30 nm and wherein the three electrically conductive layers each have a thickness of 5 nm to 10 nm, and,
    wherein a dielectric layer sequence is arranged in each case between two electrically conductive layers, which dielectric layer sequence comprises
        an anti-reflective layer comprising silicon nitride, mixed silicon-metal nitride, aluminium nitride, or tin oxide,
        a smoothing layer comprising an oxide of one or more of the elements tin, silicon, titanium, zirconium, hafnium, zinc, gallium, and indium,
        a first and a second matching layer comprising zinc oxide, and
        optionally, a blocking layer comprising niobium, titanium, nickel, chromium, and/or alloys thereof.

9. Projection arrangement for a head-up display (HUD), comprising:
    a composite pane, comprising an outer pane and an inner pane, which are connected to one another via a thermoplastic intermediate layer, with an HUD region;
    an electrically conductive coating on a surface of the outer pane or of the inner pane facing the intermediate layer or within the intermediate layer; and
    a projector that is directed toward the HUD region;
    wherein a radiation of the projector is p-polarised, wherein the composite pane with the electrically conductive coating has reflectance of at least 10% relative to p-polarised radiation in the entire spectral range from 450 nm to 650 nm, and wherein the electrically conductive coating includes three electrically conductive layers, which are each arranged between two dielectric layers or layer sequences, wherein a sum of thicknesses of all three electrically conductive layers is at most 30 nm and wherein the three electrically conductive layers each have a thickness of 5 nm to 10 nm, and wherein the electrically conductive coating has sheet resistance of 1 Ω/sq to 2 Ω/sq.

10. The projection arrangement according to claim 1, wherein the radiation of the projector is essentially purely p-polarised.

11. The projection arrangement according to claim 1, wherein external surfaces of the composite pane are arranged substantially parallel to one another.

12. The projection arrangement according to claim 1, wherein the radiation of the projector strikes the composite pane with an angle of incidence of 60° to 70°.

13. The projection arrangement according to claim 1, wherein the electrically conductive coating is connected to a voltage source of 40 V to 50 V in order to heat the composite pane.

14. A method comprising utilizing a projection arrangement according to claim 1 as an HUD in a motor vehicle.

15. The projection arrangement according to claim 1, wherein the difference between the maximally occurring reflectance and the mean of the reflectance as well as the difference between the minimally occurring reflectance and the mean of the reflectance relative to p-polarised radiation is at most 1% in the entire spectral range from 450 nm to 650 nm.

16. The projection arrangement according to claim 3, wherein the sum of the thicknesses of all three electrically conductive layers is from 20 nm to 25 nm.

17. The projection arrangement according to claim 6, wherein
the first anti-reflective layer below the first conductive layer of the three electrically conductive layers has a thickness of 20 nm to 24 nm,
the second anti-reflective layer between the first conductive layer and the second conductive layer of the three electrically conductive layers has a thickness of 30 nm to 35 nm,
the third anti-reflective layer between the second conductive layer and the third conductive layer of the three electrically conductive layers has a thickness of 75 nm to 80 nm, and
the fourth anti-reflective layer above the third conductive layer has a thickness of 37 nm to 42 nm.

18. The projection arrangement according to claim 8, wherein the mixed silicon-metal nitride is silicon-zirconium nitride.

19. The method according to claim 14, wherein the motor vehicle is a car or a truck.

20. The projection arrangement according to claim 7, wherein the mixed silicon-metal nitride is silicon-zirconium nitride or silicon-hafnium nitride.

* * * * *